US012652475B2

(12) United States Patent (10) Patent No.: US 12,652,475 B2
Finkelstein et al. (45) Date of Patent: Jun. 9, 2026

(54) INTENSITY IMAGING AND DEPTH SENSING WITH HISTOGRAM OVERFLOW PREVENTION

(71) Applicant: Meta Platforms Technologies, LLC, Menlo Park, CA (US)

(72) Inventors: Hod Finkelstein, Albany, CA (US); Gregory Cohoon, Sunnyvale, CA (US); Harish Venkataraman, Buckley, WA (US); Lei Zhu, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 53 days.

(21) Appl. No.: 18/668,730

(22) Filed: May 20, 2024

(65) Prior Publication Data

US 2024/0406597 A1 Dec. 5, 2024

Related U.S. Application Data

(60) Provisional application No. 63/470,221, filed on Jun. 1, 2023.

(51) Int. Cl.
*H04N 25/705* (2023.01)
*H04N 25/706* (2023.01)
*H04N 25/707* (2023.01)
*H04N 25/771* (2023.01)

(52) U.S. Cl.
CPC ......... *H04N 25/705* (2023.01); *H04N 25/706* (2023.01); *H04N 25/707* (2023.01); *H04N 25/771* (2023.01)

(58) Field of Classification Search
CPC .. H04N 25/705; H04N 25/706; H04N 25/707; H04N 25/771; H04N 25/773; G01S 7/4808; G01S 7/4863; G01S 7/4865; G01S 17/89
See application file for complete search history.

(56) References Cited

U.S. PATENT DOCUMENTS

| | | | |
|---|---|---|---|
| 10,275,855 B2 | 4/2019 | Price et al. | |
| 11,209,310 B2 | 12/2021 | Mellot et al. | |
| 11,328,487 B2 | 5/2022 | Kim et al. | |
| 11,480,684 B2 | 10/2022 | Ronchini Ximenes et al. | |
| 2012/0006971 A1* | 1/2012 | Pflibsen | H10F 39/1536 |
| | | | 250/208.1 |
| 2013/0335595 A1* | 12/2013 | Lee | G06T 7/20 |
| | | | 348/231.5 |
| 2015/0116564 A1* | 4/2015 | Williams | H04N 25/57 |
| | | | 348/308 |
| 2017/0052065 A1* | 2/2017 | Sharma | G01S 17/894 |
| 2018/0259645 A1* | 9/2018 | Shu | G01S 7/4816 |
| 2020/0116836 A1* | 4/2020 | Pacala | G01J 3/0224 |
| 2020/0158836 A1* | 5/2020 | Henderson | G01S 17/894 |
| 2020/0319344 A1* | 10/2020 | Ronchini Ximenes | |
| | | | G02B 27/017 |
| 2020/0348416 A1 | 11/2020 | Sakaguchi et al. | |
| 2022/0178760 A1 | 6/2022 | Guillon et al. | |
| 2022/0390576 A1* | 12/2022 | Buckbee | G01S 7/4863 |
| 2023/0176223 A1* | 6/2023 | Pacala | G01S 17/42 |
| | | | 356/5.01 |

* cited by examiner

*Primary Examiner* — Abdelaaziz Tissire
(74) *Attorney, Agent, or Firm* — Freestone Intellectual Property Law PLLC; Aaron J. Visbeek

(57) ABSTRACT
Depth and imaging pixels include Single-Photon Avalanche Diode (SPAD) micropixels. A memory stores histogram data and intensity data. Timed memory selection logic is configured to generate the histogram data and the intensity data.

12 Claims, 10 Drawing Sheets

HISTOGRAM WITH SATURATION PREVENTION

500

SATURATION

HISTOGRAM
COUNTS

TIME BINS

511

533

511

533

HISTORGRAM OVERFLOW PROTECTION

700

EMITTING LIGHT PULSES — 705

INCREMENTING HISTOGRAM BINS IN RESPONSE TO AVALANCHE EVENTS FROM LIGHT BECOMING INCIDENT ON A SPAD — 710

CEASING THE INCREMENTING OF THE HISTOGRAM BINS IN RESPONSE TO SATURATION OF ANY OF THE HISTOGRAM BINS — 715

800

INTENSITY IMAGING AND DEPTH SENSING WITH HISTOGRAM OVERFLOW PREVENTION

CROSS-REFERENCE TO RELATED APPLICATIONS

This application claims priority to U.S. provisional Application No. 63/470,221 filed Jun. 1, 2023, which is hereby incorporated by reference.

TECHNICAL FIELD

This disclosure relates generally to optics, and in particular to imaging.

BACKGROUND INFORMATION

In certain contexts, it is desirable to perform depth sensing in addition to capturing traditional intensity images of an environment. Direct time-of-flight (dToF or indirect time-of-flight (iToF) techniques may be used for depth sensing while complementary metal-oxide semiconductor (CMOS) image pixels may be used for the intensity imaging. Red-green-blue (RGB) or RGGB filters may be placed over the image pixels to capture color intensity images in a CMOS image sensor. Augmented Reality (AR), Mixed Reality (MR), and/or Virtual Reality (VR) contexts may benefit from depth sensing in addition to capturing intensity images. In some applications, it is advantageous to fuse depth sensing images with intensity images.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
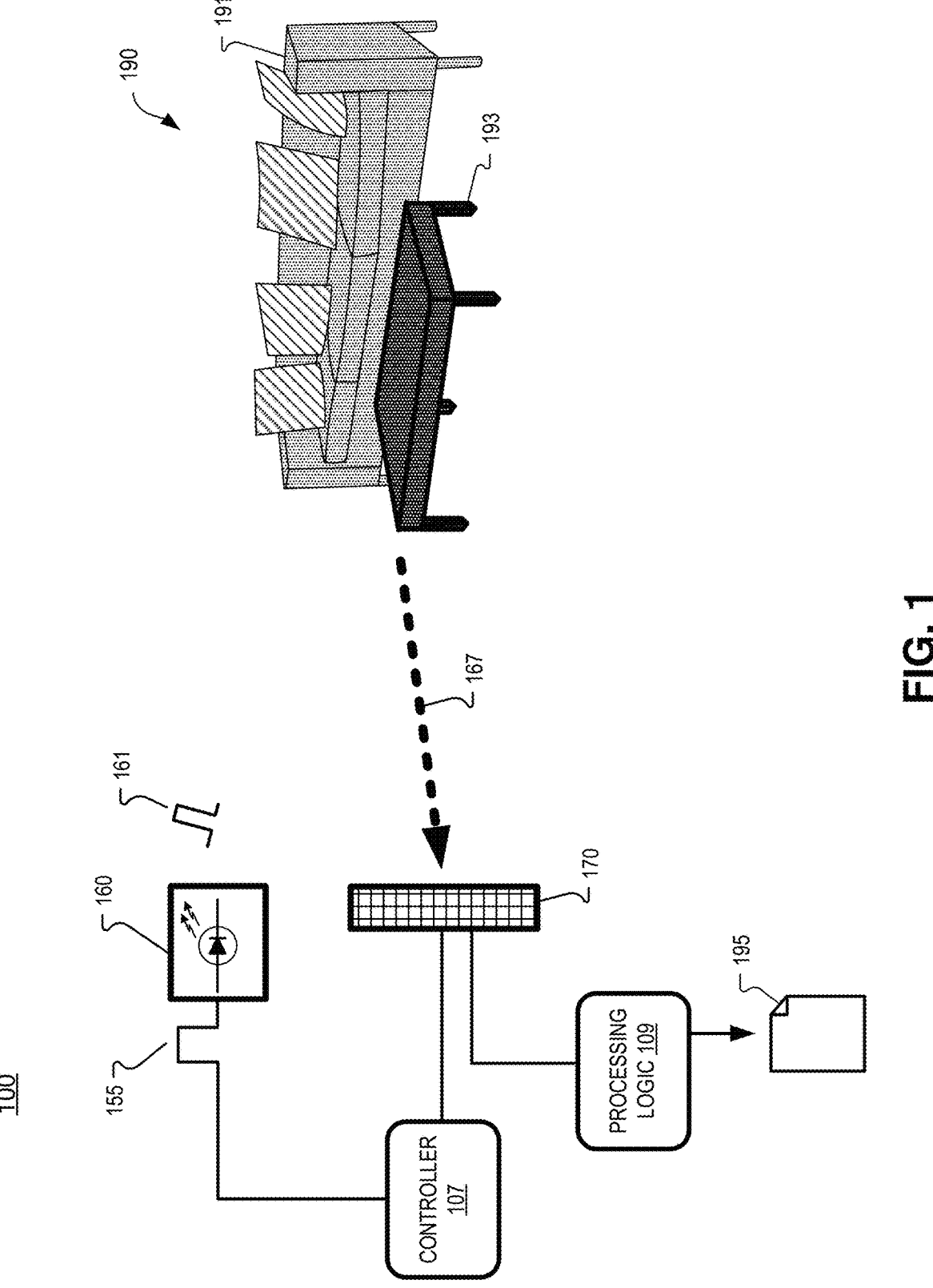
FIG. 1 illustrates an example system for imaging and depth sensing of an environment, in accordance with aspects of the disclosure.

Embodiments of intensity imaging, depth sensing, and histogram overflow prevention are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

Augmented Reality (AR), Mixed Reality (MR), and Virtual Reality (VR) systems are constrained by footprint, power, and cost. These systems may benefit from three-dimensional (3D) depth sensing and two-dimensional (2D) intensity imaging. Fusing 2D and 3D data requires significant compute power, especially when the scene is viewed from slightly different angles from depth sensors and image sensors that are not co-located. To reduce the compute power required for fusing, the depth sensors and intensity sensors would ideally be co-located or very close to co-located. Another desirable feature would contemporaneous acquisition for both the depth sensing and the intensity imaging, in order to reduce motion artifacts and simplify the system. When direct time-of-flight (dToF) sensing is used for 3D sensing, it is desirable to acquire with a global shutter, in order to reduce motion artifacts and simplify the system. However, implementing a global shutter requires significant memory allocation and the memory may need to be in-pixel memory. The memory array would need to include enough memory locations and bit depth to store histograms, for example. Problematically, the required memory along with the readout and timing circuitry for depth sensing has historically taken up too much real estate to fit in-pixel to provide global shutter capabilities. In other words, global shutter with in-pixel histogramming requires a large silicon area. Furthermore, 2D sensing in these applications typically requires low-ambient sensitivity, In implementations of the disclosure, a sensor architecture includes macropixels that include more than one micropixel. Each micropixel may include at least one singe-photon avalanche photodiode (SPAD). Each macropixel may include readout circuit necessary for processing the time-of-flight (ToF) information from the micropixels of the macropixel. In some implementations, a global shutter is used to capture depth data and intensity data in a same frame. In some implementations, depth information is collected in a depth frame and intensity information is captured in a second frame. Mode selection logic may select an acquisition mode—either ToF (depth) or intensity imaging. During a ToF capture, signals from one or more micropixels are processed in the macropixel processing circuit to generate a histogram. An intensity image captured by the macropixel may have a higher resolution than a depth image generated by the macropixel. In implementations of the disclosure, a sensor that includes an array of the described macropixels is utilized in an AR, MR, or VR headset to generate passthrough images and realistic occlusions with reduced distortion.

A histogram overflow prevention technique is also disclosed that may reduce the bit-depth of memory used to store a histogram. This technique, combined with other aspects of the disclosure may reduce the in-pixel memory and readout circuitry to be able to fit within the macropixel. In an implementation of a histogram overflow prevention technique, light pulses (e.g. near-infrared light pulses) are emitted and histogram bins are incremented in response to avalanche events from light becoming incident on one more SPADs. When any of the histogram bins become saturated, the incrementing of all the histogram bins may cease. The saturation of a histogram bin may be defined as when a maximum bin value of any of the histogram bins is reached. Stopping the exposure (ceasing to increment histogram bins) extends the signal dynamic range of the depth sensing architecture without having to expand the bit-depth of the memory cells. The signal dynamic range is extended at least in part because ceasing the histogram construction after saturation of a histogram bin ensures the data integrity of the histogram. The signal dynamic range may be related to a ratio of the received light signal whereas ambient dynamic range may be a ratio of the ambient level which saturates a sensor to the smallest ambient signal.

Some histogram overflow prevention techniques may "top" the histogram before saturation, although a timer to calculate how long (in time or in number of laser pulses are emitted) it took to reach saturation may be required to calculate intensity in addition to depth. In implementations of the disclosure, intensity may be measured separately or sequentially which does not require timers. Timers require routing fast signals and adding more memory to store the timer counts, which may take up real estate in a micropixel. Thus, omitting the timer may be advantageous.

FIG. 1 illustrates an example imaging and depth system 100 for imaging and depth sensing of an environment 190, in accordance with aspects of the disclosure. System 100 may be included in a head-mounted display (HMD), smartglasses, or other contexts such as robotics and/or gaming. In the illustration of FIG. 1, environment 190 includes a couch 191 (with striped throw pillows) situated with a coffee table 193.

System 100 includes an illumination module 160, an imaging and depth sensing device 170, a controller 107, and processing logic 109. In some implementations, illumination module 160 may illuminate environment 190 with one or more pulses of near-infrared illumination light 161. Illumination module 160 may include one or more lasers or LEDs as light sources to generate illumination light 161. In some implementations, each light source and/or groups of light sources are addressable (i.e., may be controlled independent from other light sources and/or groups of light sources). In some implementations, the illumination module 160 may also include an optical assembly that can be used to direct light from illumination module 160 to specific regions within the environment 190. In some implementations, illumination module 160 may emit flood illumination, a pattern (e.g., dots, bars, etc.), or some combination thereof. Illumination module 160 may be configured to generate ToF light pulses in response to a driving signal 155 received from controller 107.

In the illustrated example, illumination module 160 emits ToF light pulses 161. Illumination module 160 is communicatively coupled with controller 107. Controller 107 is communicatively coupled to imaging and depth sensing device 170. Imaging and depth sensing device 170 may be co-located with illumination module 160 and configured to capture ToF return signals 167 that are reflected (or scattered) from objects in the environment 190. A variable delay line may be connected to the controller, laser driver, or the timing circuitry of the SPAD receiver, and may be utilized in a calibration step to calibrate against temporal signal offsets such that time signatures from the SPAD may be translated to physical distance traversed by the light from emission to reception.

Imaging and depth sensing device 170 may include macropixels that include SPADs. In an implementation, each macropixel includes four micropixels that each include a SPAD. The SPAD may be used to sense both ToF (depth) and intensity information of environment 190.

The processing logic 109 may be configured to receive intensity data and depth data from imaging and depth sensing device 170, in accordance with aspects of the disclosure. Processing logic 109 may generate fused data 195 that includes (or is derived from) the intensity data and the depth data received from imaging and depth sensing device 170. The fused data 195 may be provided to another processing unit (not illustrated) for further downstream processing.

Figure 2B:
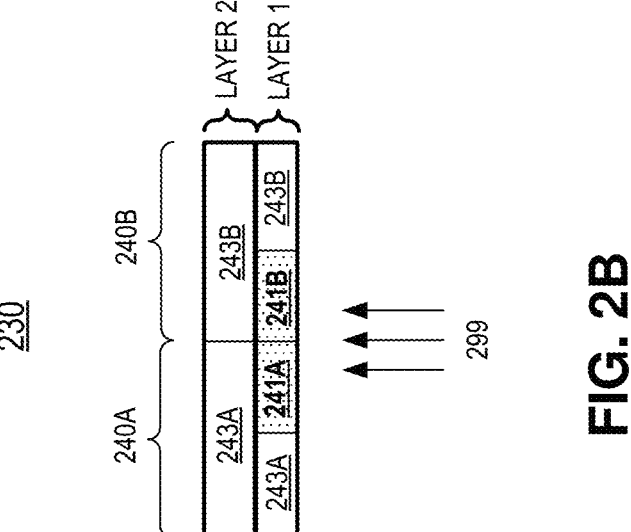
FIG. 2B illustrates an example layered layout of an example macropixel through a cross-section through a plane in FIG. 2A, in accordance with aspects of the disclosure.
Figure 2A:
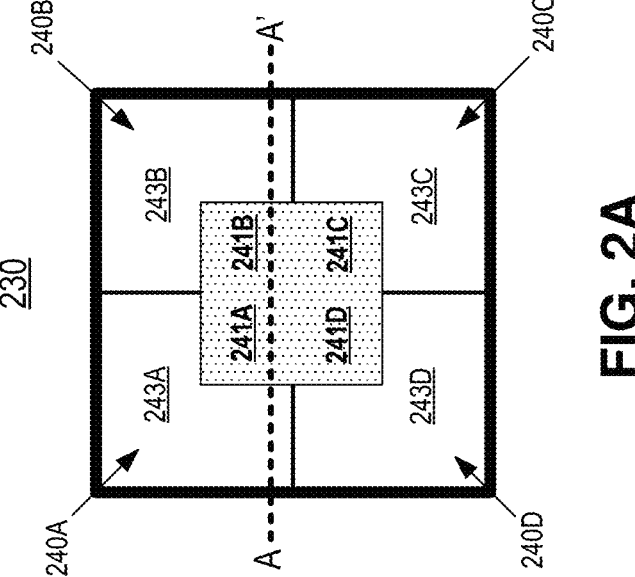
FIG. 2A illustrates an example macropixel that may be included in an imaging and depth sensing device, in accordance with aspects of the disclosure.

FIG. 2A illustrates an example macropixel 230 that may be included in imaging and depth sensing device 170, in accordance with aspects of the disclosure. Example macropixel 230 includes four micropixels 240A, 240B, 240C, and 240D (collectively referred to as micropixels 240). Each micropixel 240 may be arranged in a rectangle. Micropixel 240A includes photosensitive region 241A and non-photosensitive region 243A. Micropixel 240B includes photosensitive region 241B and non-photosensitive region 243B. Micropixel 240C includes photosensitive region 241C and non-photosensitive region 243C and micropixel 240D includes photosensitive region 241D and non-photosensitive region 243D. The photosensitive regions 241 may represent a SPAD of the micropixel 240. The photosensitive regions 241 may be covered by filters so that only a narrow wavelength of light becomes incident on the photosensitive region. The filter may be a near-infrared filter that is matched to pass only the narrow bandwidth of laser light that is used as illumination light 161. In-pixel memory, timing circuitry, selection logic, and/or readout circuitry may occupy non-photosensitive regions 243. The in-pixel memory, timing circuitry, selection logic, and/or readout circuitry may be incorporated in the pixel, on the die periphery, and/or outside the die.

In an implementation, 60 in-pixel memory locations may correspond to 60 histogram bins whose values are incremented based on the times of avalanche events in SPADs of the macropixel. The outputs of all the micropixels 240 in the macropixel 230 may be used to control (e.g. increment) the contents of all the memory locations in the macropixel in order to generate a ToF histogram. Thus, a histogram that utilizes photosensitive regions 241A, 241B, 241C, and 241D in macropixel 230 may be generated, processed, and read out.

FIG. 2B illustrates an example layered layout of example macropixel 230 through a cross-section of plane A-A' of FIG. 2A, in accordance with aspects of the disclosure. Light 299 propagates toward photosensitive regions 241A and 241B of micropixels 240A and 240B, respectively. Light 299 may be returning light from a laser pulse reflecting or scattering from environment 190, for example. FIG. 2B shows that at least a portion of the non-photosensitive region 243 of a given micropixel may be disposed in a second layer behind the photosensitive region 241 of the micropixel. Layer 1 in FIG. 2B may be bonded to Layer 2 in FIG. 2B. Layer 1 may be formed on a separate wafer from Layer 2. In some implementations, Layer 1 includes both the photosensitive region 241 of the micropixel and a portion of the non-photosensitive region 243.

Figure 2C:
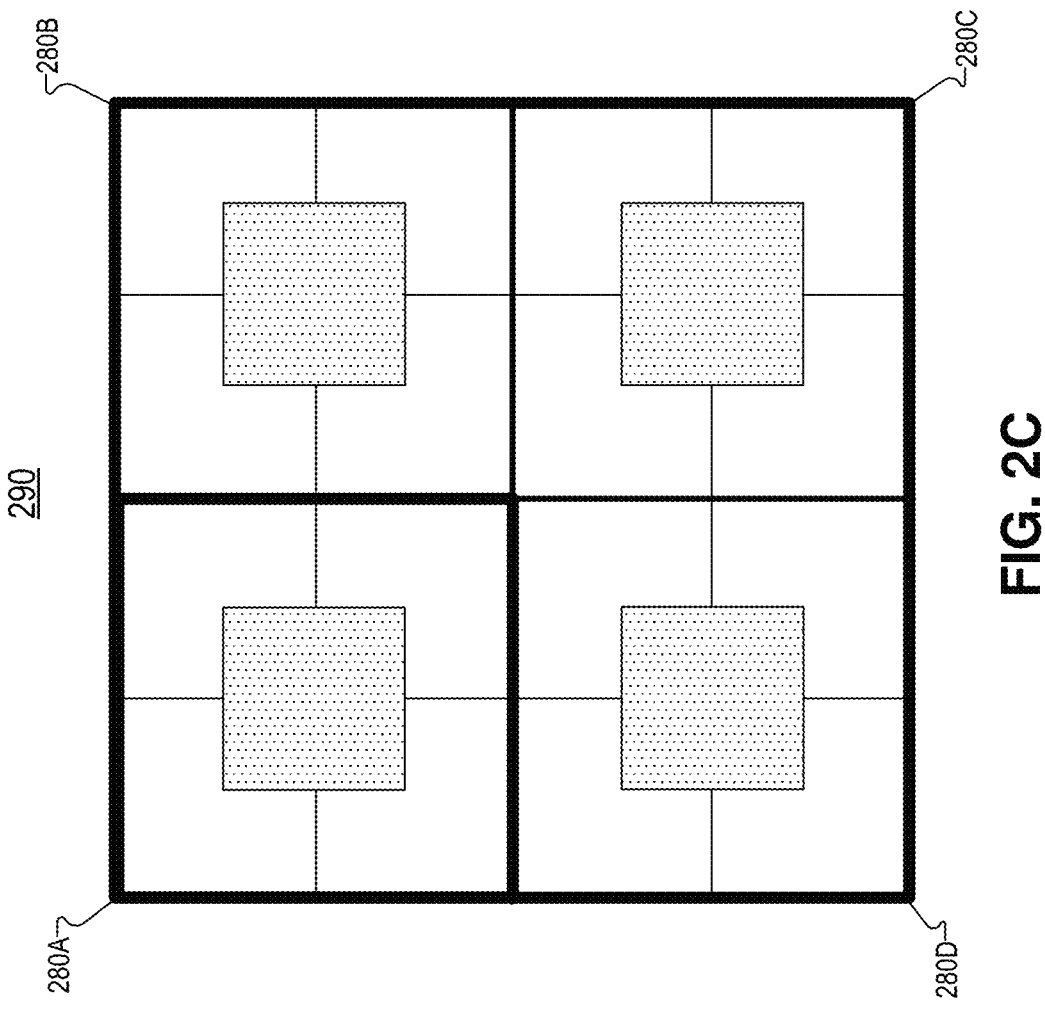
FIG. 2C illustrate an example arrangement of a 2×2 floorplan of macropixels, in accordance with aspects of the disclosure.

FIG. 2C illustrate an example arrangement 290 of a 2×2 floorplan of macropixels, in accordance with aspects of the disclosure. Arrangement 290 includes macropixels 280A, 280B, 280C, and 280D (collectively referred to as macropixels 280). Each of the macropixels 280 may include the features of example macropixel 230. Alternative arrangements of macropixels are contemplated. Other arrangements of macropixels may be 1×2, 3×2, 3×3, or otherwise.

Figure 3A:
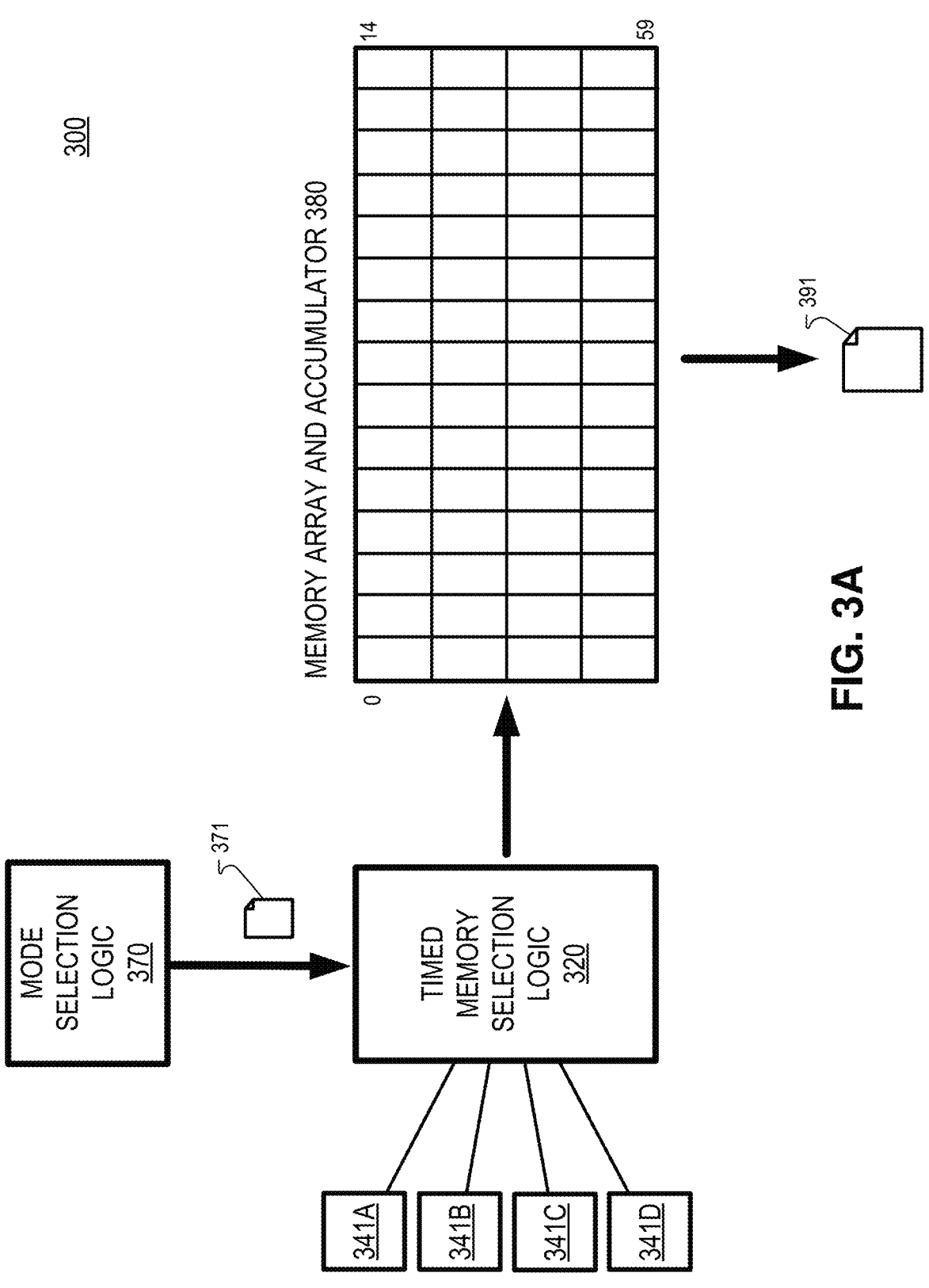
FIG. 3A illustrates an example depth and imaging system that includes a memory array that receives inputs from a plurality of SPADs to generate a histogram in a depth mode, in accordance with aspects of the disclosure.
Figure 3B:
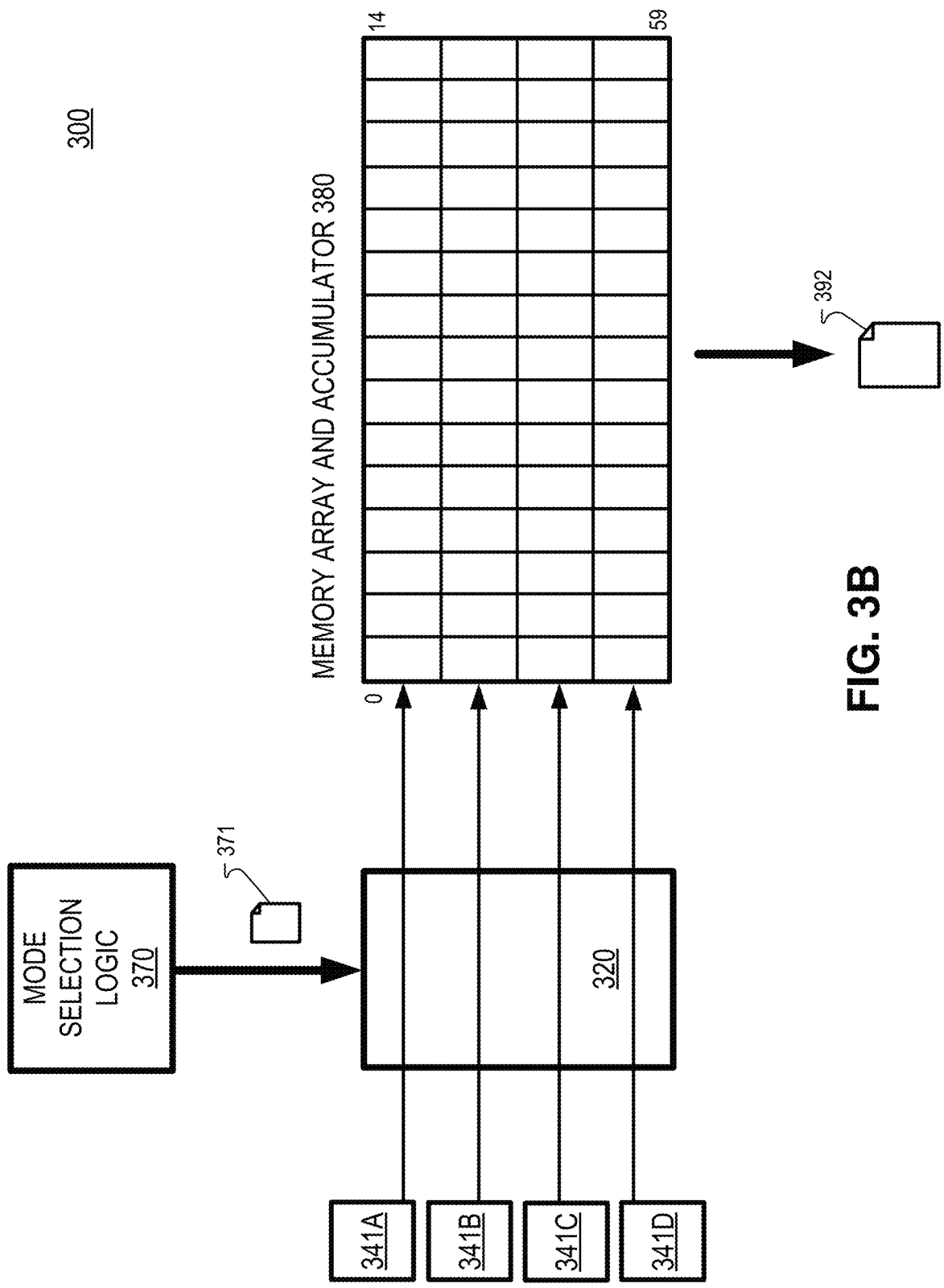
FIG. 3B illustrates that a depth and imaging system may also generate intensity data in an intensity mode, in accordance with aspects of the disclosure.

FIG. 3A illustrates an example depth and imaging system 300 that includes a memory array that receives inputs from a plurality of SPADs to generate a histogram in a depth mode, in accordance with aspects of the disclosure. FIG. 3B illustrates that depth and imaging system 300 may also generate intensity data in an intensity mode, in accordance with aspects of the disclosure. System 300 includes memory array and accumulator 380, timed memory selection logic 320, and mode selection logic 370. System 300 also includes SPAD micropixels 341A, 341B, 341C, and 341D (collectively referred to as SPAD micropixels 341). SPADs micropixels 341A, 341B, 341C, and 341D may be the photosensitive regions 241A, 241B, 241C, and 241D, respectively, in macropixel 230. In some implementations, SPAD micropixels 341 are configured to generate avalanche events in response to near-infrared light becoming incident on the SPAD micropixels. Timed memory selection logic 320 and memory array 380 may be disposed in the non-photosensitive regions 243 of macropixel 230.

Mode selection logic 370 may be configured to provide a mode selection signal 371 to timed memory selection logic 320. Timed memory selection logic 320 may activate a depth mode (ToF mode) or intensity mode in response to receiving the mode selection signal 371 from mode selection logic 370. In an implementation, mode selection signal 371 defines a ratio of depth frames and intensity frames to be captured by system 300, where the depth frames are generated from photon times-of-flight histogram data 391 of FIG. 3A and the intensity frames are generated from intensity data 392 of FIG. 3B. Mode selection logic 370 may be disposed outside the macropixel that includes SPADs 341.

FIG. 3A illustrate a depth mode of system 300 for generating photon times-of-arrival histogram data 391. In depth mode, memory array 380 will store photon times-of-arrival histogram data 391. The quantity of photons per timer interval (histogram bin) and their time of arrival are measured in depth mode. In depth mode, timed memory selection logic 320 is configured to generate photon times-of-arrival histogram data 391 in response to avalanche events generated by SPAD micropixels 341A, 341B, 341C, and 341D. Importantly, any avalanche event from any of the plurality of SPAD micropixels 341 will cause timed memory selection logic 320 to increment a histogram bin in a memory location of memory array 380. In other words, if any of the SPAD micropixels in a macropixel generate an avalanche event, the histogram for that macropixel will be incremented.

In FIG. 3A memory array 380 is illustrated as including 60 memory locations (0-59). The memory locations may be 8-bit memory locations, in some implementations. Timed memory selection logic 320 increments different memory locations of memory array 380 in response to avalanche events from SPAD micropixels 341 to generate photon times-of-arrival histogram data 391.

In some implementations, SPAD micropixels 341 and timed memory selection logic 320 are disposed on a same die (e.g. layer 1 of FIG. 2B) and that die is vertically stacked on a second die (e.g. layer 2 of FIG. 2B). In some implementations, SPAD micropixels 341, timed memory selection logic 320, and mode selection logic 370 are disposed on a same die (e.g. layer 1 of FIG. 2B) and that die is vertically stacked on a second die (e.g. layer 2 of FIG. 2B).

Timed memory selection logic 320 may include additional inputs (not specifically illustrated). Those inputs may provide logic 320 a reference time correlated with emitted light pulses (e.g. pulse 161) that illuminate an environment. Logic 320 may also receive a stop signal.

Referring again to FIG. 3B, timed memory selection logic 320 is configured to generate intensity data 392 in an intensity mode. Photon times-of-arrival histogram data 391 will be readout from memory array 380 so that at least a portion of memory array 380 can be used to store intensity data 392. The intensity data 392 is generated in memory array 380 in response to second avalanche events generated by the SPAD micropixels 341. The second avalanche events are generated in a non-overlapping time period from the first avalanche events generated during a depth mode of system 300.

During intensity mode, SPAD micropixels 341 are configured to directly increment specific memory locations of memory array 380 to populate the memory array with the intensity data. Thus, the values in the memory locations do not contain timing information in intensity mode, but rather the total number of photons collected by each SPAD micropixel 341. In an implementation, during an image capture period, SPAD micropixel 341A may directly increment a first memory location with first intensity data, SPAD micropixel 341B may directly increment a second memory location with second intensity data, SPAD micropixel 341C may directly increment a third memory location with third intensity data, and SPAD micropixel 341D may directly increment a fourth memory location with fourth intensity data.

For the image capture period, the first memory location will include the number of avalanche events generated by SPAD micropixel 341A, the second memory location will include the number of avalanche events generated by SPAD micropixel 341B, the third memory location will include the number of avalanche events generated by SPAD micropixel 341C, and the fourth memory location will include the number of avalanche events generated by SPAD micropixel 341D. Thus, the intensity for each individual SPAD micropixel 341 can be determined by the number stored in each memory location at the end of the image capture period. Each SPAD micropixel 341 may have a 1:1 correspondence with a memory location in memory array 380 for storing intensity data.

In some implementations, more than one memory location may be used to record the events for a particular SPAD micropixel during the image capture period, in order to increase the dynamic range of the image. In an implementation, each SPAD micropixel is connected to fifteen of the sixty memory locations in memory array 380. Since memory array 380 may have more memory than is required for intensity data, the unused memory locations of memory array 380 may be used to store bursts of images in intensity mode, or multiple images in order to generate high dynamic range (HDR) images.

In implementations of the disclosure, an intensity frame generated from intensity data 392 may have a higher resolution than a depth frame generated from photon times-of-arrival histogram data 391. In the specific illustration of FIGS. 3A and 3B, the intensity frame would have four times the resolution of the depth frame. In an implementation, the intensity frame has a video graphics array (VGA) resolution and the depth frame has quarter video graphics array (QVGA) resolution.

In implementations, an imaging and depth sensing device includes a plurality of macropixels 230 that may include micropixels 341. Macropixel 230 may also include logic 320 and memory array 380. In an implementation, the imaging and depth sensing device including a plurality of macropixels 230 in a SPAD array may generate a rolling shutter where some portions of the SPAD array operate in depth mode while some portions of the SPAD array operate in intensity mode at any given time. In some implementations, only the portions of the SPAD array that are operated in the depth mode receive infrared illumination generated by an infrared illumination module (e.g. module 160). The infrared illumination module may only illuminate portions of environment 190 that the macropixels in depth mode are configured to image, for example.

Figure 4:
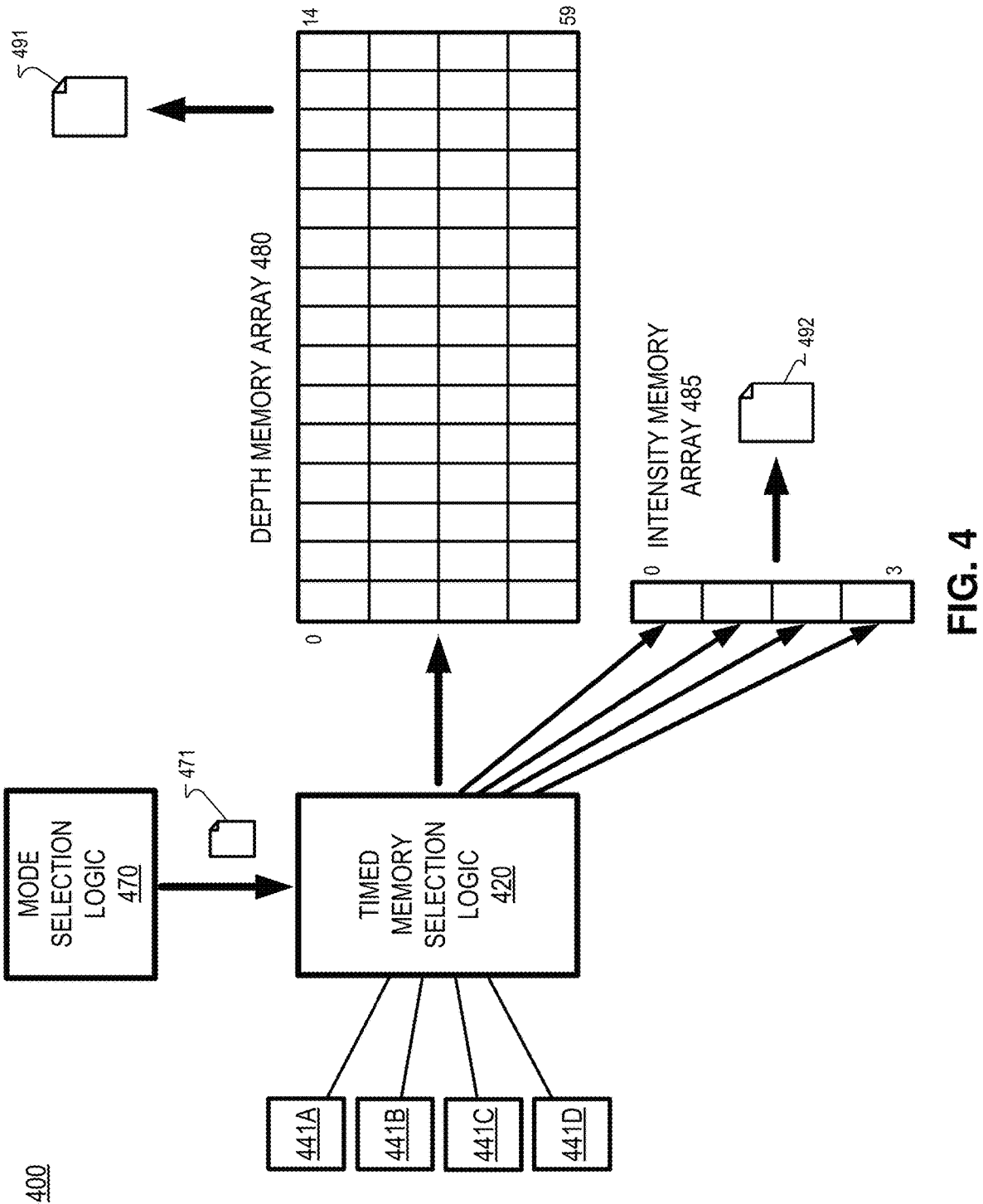
FIG. 4 illustrates an example depth and imaging system that includes a depth memory array and an intensity memory array to facilitate a global shutter, in accordance with aspects of the disclosure.

FIG. 4 illustrates an example depth and imaging system 400 that includes a depth memory array 480 and an intensity memory array 485 to facilitate a global shutter, in accordance with aspects of the disclosure. Depth memory array 480 is configured to store photon times-of-arrival histogram data 491. In FIG. 4, depth memory array 480 is illustrated as including 60 depth memory locations (0-59). The depth memory locations may be 8-bit memory locations, in some implementations. Intensity memory array 485 is configured to store intensity data 492. In FIG. 4, intensity memory array 485 is illustrated as including four intensity memory locations (0-3). The intensity memory locations may be 8-bit memory locations, in some implementations. The intensity memory locations may have a larger bit-depth than the depth memory locations, in some implementations. In some implementations, memory array 480 and memory array 485 are combined into a single physical memory array with certain memory locations reserved to store photon times-of-arrival histogram data 491 and different memory locations reserved to store intensity data 492.

System 400 includes depth memory array 480, timed memory selection logic 420, and mode selection logic 470. System 400 also includes SPAD micropixels 441A, 441B, 441C, and 441D (collectively referred to as SPADs micropixels 441). SPADs micropixels 441A, 441B, 441C, and 441D may be the photosensitive regions 241A, 241B, 241C, and 241D, respectively, in macropixel 230. In some implementations, SPAD micropixels 441 are configured to generate avalanche events in response to near-infrared light becoming incident on the SPAD micropixels. Timed memory selection logic 420, depth memory array 480, and intensity memory array 485 may be disposed in the non-photosensitive regions 243 of macropixel 230. In some implementations, SPAD micropixels 441 and timed memory selection logic 420 are disposed on a same die (e.g. layer 1 of FIG. 2B) and that die is vertically stacked on a second die (e.g. layer 2 of FIG. 2B). In some implementations, SPAD micropixels 441, timed memory selection logic 420, and mode selection logic 470 are disposed on a same die (e.g. layer 1 of FIG. 2B) and that die is vertically stacked on a second die (e.g. layer 2 of FIG. 2B).

Timed memory selection logic 420 is configured to (1) generate histogram data by incrementing memory locations in the depth memory array in response to avalanche events generated by SPAD micropixels 441; and (2) increment the intensity memory array 485 in response to those same avalanche events generated by SPAD micropixels 441. This may result in each avalanche event being used for both depth information (incrementing a histogram bin) and intensity information (incrementing a specific memory location in intensity memory array 485).

The memory locations of depth memory array 480 correspond to histogram bins incremented by timed memory selection logic 420 based on times of the avalanche events generated by SPAD micropixels 441. Intensity memory locations of intensity memory array 485 correspond to a specific SPAD micropixel among the SPAD micropixels 441, whereas the memory locations of depth memory array 480 are unassociated with specific SPAD micropixels since any avalanche event from any of SPAD micropixels 441 will result in timed memory selection logic 420 incrementing the memory location associated with a particular histogram bin.

Timed memory selection logic 420 may be configured to only increment a first intensity memory location (in intensity memory array 485) in response to a first SPAD micropixel 441A generating first avalanche events and only increment a second intensity memory location (in intensity memory array 485) in response to a second SPAD micropixel 441B generating second avalanche events. In this example, timed memory selection logic 420 would also be configured to increment memory locations in depth memory array 480 in response to either the first avalanche events generated by the first SPAD micropixel 441A or the second avalanche events generated by the second SPAD micropixel 441B. In an implementation, timed memory selection logic 420 is configured to increment memory locations in the depth memory array in response to any of the SPAD micropixels 441 generating the avalanche events and increment a specific intensity memory location (e.g. memory location 0) of intensity memory array 485 in response to a specific SPAD micropixel (e.g. SPAD micropixel 441A) generating an avalanche event.

In implementations, an imaging and depth sensing device includes a plurality of macropixels 230 that may include micropixels 441. Macropixel 230 may also include logic 420 and memory array 480.

In an implementation, in response to a first avalanche event, timed memory selection logic 420 is configured to simultaneously: (1) increment a memory location in depth memory array 480 to increment a histogram bin regardless of which of the SPAD micropixels 441 generated the first avalanche event; and (2) select a specific intensity memory location of intensity memory array 485 to increment based on which of the SPAD micropixels generated the first avalanche event. The specific intensity memory location that is selected by timed memory selection logic 420 may have a 1:1 correspondence with a specific SPAD micropixel that generated the first avalanche event.

In implementations of the disclosure, an intensity frame generated from intensity data 492 may have a higher resolution than a depth frame generated from photon times-of-arrival histogram data 491. In the specific illustration of FIG. 4, the intensity frame would have four times the resolution of the depth frame. In an implementation, the intensity frame has a video graphics array (VGA) resolution and the depth frame has quarter video graphics array (QVGA) resolution. In implementations of the disclosure, filters such as red, green, blue, and infrared filters may be applied on top of four SPAD micropixels in a macropixel so that a red-green-blue-infrared (RGBI) intensity image may be generated from intensity data 492.

Mode selection logic 470 may be configured to provide a mode selection signal 471 to timed memory selection logic 420. In an implementation, mode selection signal 471 defines a ratio of depth frames and intensity frames to be captured by system 400, where the depth frames are generated from photon times-of-arrival histogram data 491 and the intensity frames are generated from intensity data 492. The ratio of depth frames to intensity frames may change based on the case requirements from an AR/VR system, for example. Mode selection logic 470 may be disposed outside the macropixel that includes SPAD micropixels 441.

In an implementation, timed memory selection logic 420 is configured to ignore a threshold number (e.g. 15) of initial avalanche events and not write them to memories 480 nor 485. This may be advantageous when a light source generating light pulses (e.g. near-infrared light pulses) is in close proximity to depth and imaging pixels (e.g. macropixels 230) where optical crosstalk from the light pulse being emitted may generate avalanche events for SPADs in the macropixel. In an implementation, timed memory selection logic 420 is configured to ignore a threshold number of initial avalanche events by refraining from incrementing the intensity memory array in response to receiving the threshold number of initial avalanche events; and (2) increment the memory locations in the depth memory to generate the histogram data in response to the initial avalanche events.

It is also possible to have simultaneous intensity and depth acquisition in a single frame under certain design considerations. In the current example, this could be a VGA intensity image and QVGA Depth image. Typically, all of the available under pixel area real estate not used for driving the sensor will be dedicated to this memory array sized for histogram acquisition. If that is not the case and dedicated memory can be spared for intensity (i.e. one memory cell per pixel). The memory selection logic can assign time correlated events to the appropriate memory array as well as directly pass the individual pixel events to the intensity array. The selection block can include a filter to discard events based on the timing. This is used in active illumination modes to filter out stray light or isolate the active laser pulse intensity for known ranges.

Figure 5:
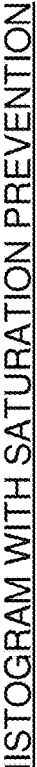
FIG. 5 illustrates a histogram chart that includes a conventional histogram and a saturation prevention histogram, in accordance with aspects of the disclosure.

FIG. 5 illustrates a histogram chart 500 that includes a conventional histogram 511 and a saturation prevention histogram 533, in accordance with aspects of the disclosure. Implementations of the disclosure include methods of pausing or ceasing histogram accumulation before the memory is saturated. Conventional histogram 511 shows a common problem where the peak of the histogram waveform is cut off because the memory has been saturated for certain histogram bins. Saturation occurring may be defined when a maximum bin value of any of the histogram bins is reached. In a memory location with 256 bit-depth, incrementing to 255 would be considered saturation of the histogram bin, for example.

In contrast to the cutting off of conventional histogram waveform 511, histogram waveform 533 approaches, but does not exceed saturation because the exposure was dynamically halted when saturation occurred for any single histogram bin. Stopping the exposure dynamically results in a higher fidelity histogram waveform. This higher fidelity histogram waveform extends the dynamic range of the system without having to expand the bit-depth of the memory locations or even being able to utilize smaller memory locations while still achieving similar results as conventional histogram techniques.

Smaller memory locations for generating histograms may allow the reduction in memory (and size) of memory arrays 380 and 480, which in turn, may allow the histogram memory to have a size that will reduce the overall size of the chip or even fit "in-pixel" within non-photosensitive regions 243 of macropixel 230. In the case of depth and imaging system 400, this reduction in memory may assist in facilitating the in-pixel memory and circuitry that would be needed for global shutter techniques.

In some implementations of saturation prevention, the histogram checks each bin for overflow likely during accumulation. If a bin memory is full, a flag is set to indicate overflow. If the overflow flag is set, then accumulation would be paused so that no more data is added into the histogram. The bit-depth requirement of memory locations depends on long range SNR and ambient condition.

While recording a dTOF signal, events from SPADs are converted to timing by means of TDC or ripple counter or other timing converter and are accumulated over a set exposure time into finite length histogram which is correlated with the overall modulation frequency of the sensor (either dictated by the pulse repetition, or the histogram length itself)

In an implementation, there are 256 bits of memory per bin (from 0-255). Each pulse can be recorded as zero, one, or multiple events into various bins. When a single bin in the histogram reaches 256 events, it flags an overflow bit at which case the digital addition circuit is disabled for the histogram building circuit. There are multiple histogram building circuits in a sensor to allow for multiple depth points to be read simultaneously. If one histogram building circuit is disabled, the others may continue to accumulate.

Some implementations include the option to record the number of histogram or pulse repetitions that have elapsed at the time of halting acquisition for this histogram. The pulse repetitions are whatever drives the number of times the histogram period is repeated in the system. This may be referred to as pulse repetition interval (PRI). Recording this data may be important to allow the system to do corrections in post processing which need this information to accurately process the histogram.

Some embodiments include the option to define a window where the system ignores potential saturation. This may be valuable at the short range where there may be cross talk in the sensor that cannot be avoided and would prematurely halt the sensor acquisition.

Figure 6:
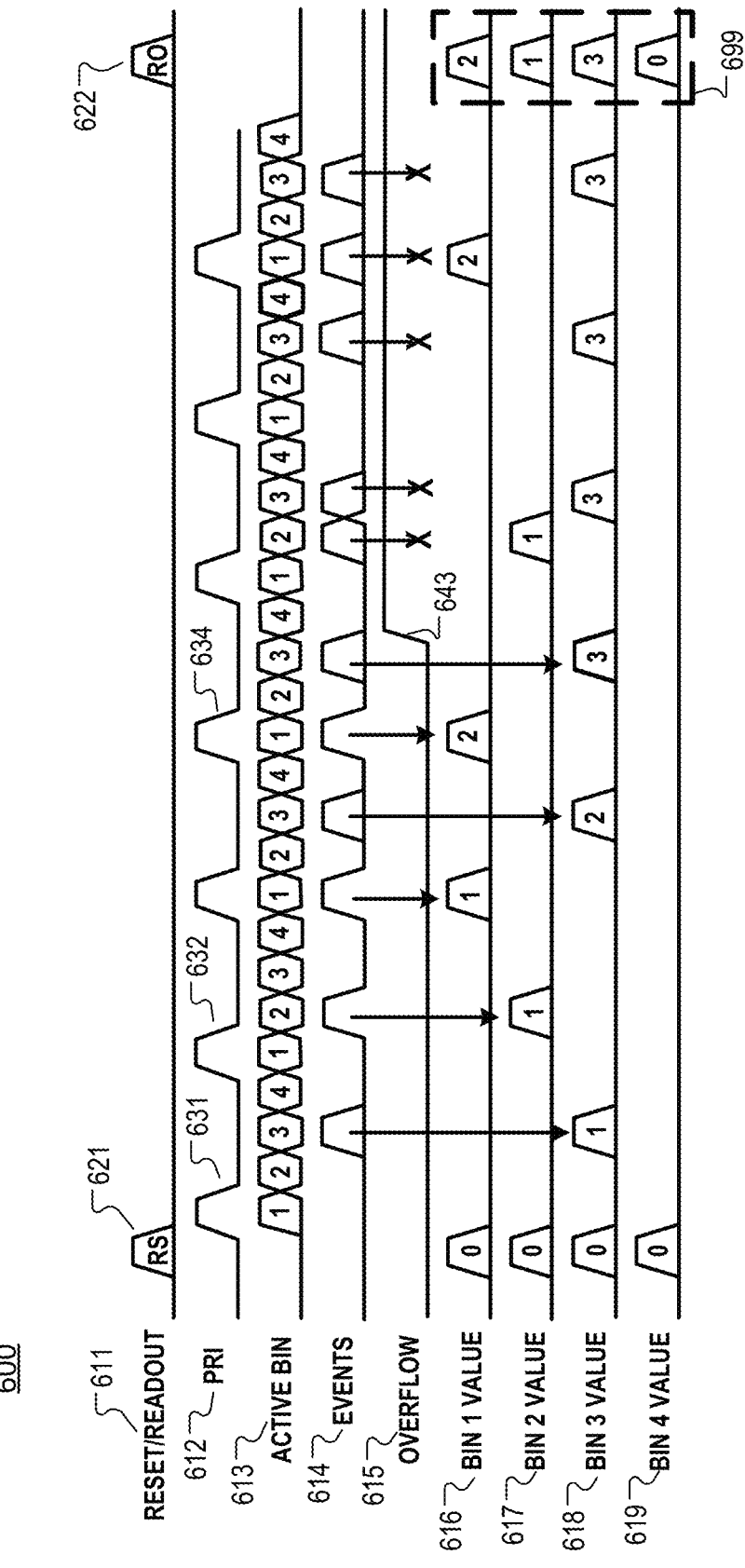
FIG. 6 illustrates a timing diagram that shows a simplified version of histogram overflow protection, in accordance with aspects of the disclosure.

FIG. 6 illustrates a timing diagram 600 that shows a simplified version of histogram overflow protection, in accordance with aspects of the disclosure. Timing diagram 600 shows a 2-bit memory example that saturates after 3 counts, although the concepts conveyed in timing diagram 600 may be extended to other memory sizes such as 8-bit memory locations for histogram bins. Timing diagram 600 shows reset/readout line 611, a pulse repetition interval (PRI) signal 612, active bins 613, events 614, overflow flag signal 615, bin 1 value 616, bin 2 value 617, bin 3 value 618, bin 4 value 619.

At reset 621, bin 1 value 616 is zero, bin 2 value 617 is zero, bin 3 value 618 is zero, and bin 3 value 616 is zero. After reset 621, a first light pulse 631 is emitted and an avalanche event is detected for a third histogram bin and bin 3 value 618 is incremented from zero to one. A second light pulse 632 is emitted and an avalanche event is detected for a second histogram bin and bin 2 value 617 is incremented from zero to one. Light pulses continue to be emitted and histogram bins are incremented until one of the histogram bins is saturated. In the illustrated example, bin 3 value 618 reaches three after the fourth light pulse 634 is emitted and a count of three is saturated in a 2-bit memory location. Since bin 3 value 618 has reached three, saturation flag 643 goes high on overflow flag signal 615 after bin 3 value 618 reaches saturation.

Noticeably, after the saturation flag 643 goes high, subsequent events are not recorded in their respective histogram bins, as denoted by the "X" below the lines in the events that are subsequent to saturation flag 643 going high. At readout 622, histogram 699 is read out from the four bins.

Figure 7:
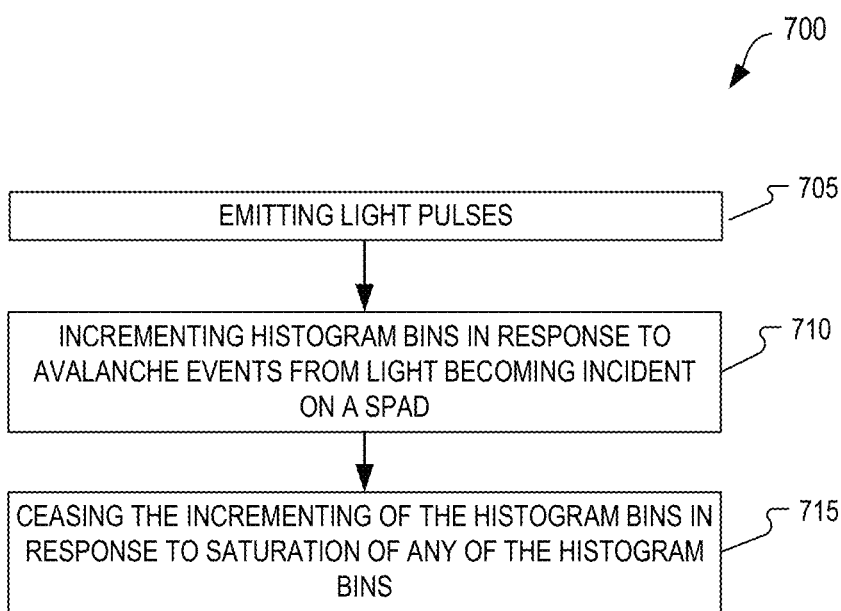
FIG. 7 illustrates an example process for histogram overflow protection, in accordance with aspects of the disclosure.

FIG. 7 illustrates an example process for histogram overflow protection, in accordance with aspects of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

In process block 705, light pulses are emitted. The light pulses may be near-infrared laser pulses (e.g. pulses 161 in FIG. 1). The light pulses may be emitted from a head-mounted display to illuminate an environment (e.g. environment 190).

In process block 710, histogram bins are incremented in response to avalanche events from light becoming incident on a SPAD. The SPAD may be included in a micropixel that is included in a macropixel (e.g. macropixel 230). The light incident on the SPAD may be returning near-infrared light (e.g. light 167) that is reflecting/scattering from an environment.

In process block 715, the incrementing of the histogram bins is ceased in response to saturation of any of the histogram bins. Saturation may occur when a maximum bin value of any of the histograms is reached. In some implementations, an overflow flag is set in response to the saturation of any of the histogram bins.

In an implementation of process 700, analog circuitry of histogram circuitry is shut down. The histogram circuitry is configured to generate the histogram. Shutting down the analog circuitry may save significant power since, for example, charging circuits of the histogram circuitry may expend meaningful electrical power.

In an implementation of process 700, a pulse repetition interval value is recorded and an intensity value is generated by comparing the pulse repetition interval to a prior pulse repetition value associated with a prior saturation of a prior histogram bins. The pulse repetition interval value is the number of light pulses emitted to reach saturation. In this way, intensity values can be determined by comparing how long it takes (based on how many light pulses are emitted) for the histogram to reach saturation.

In implementations of the disclosure, systems 300 and 400 or process 700 may be utilized in a robotics, autonomous vehicles, and/or VR/AR headset. Of course, implementations of the disclosure may be utilized in a variety of contexts where both depth sensing and intensity imaging is desirable.

Figure 8:
FIG. 8 shows that imaging and depth sensors are placed on a head mounted display (HMD), in accordance with aspects of the disclosure.

FIG. 8 shows that imaging and depth sensors 870A and 870B are placed on head mounted display (HMD) 800, in accordance with aspects of the disclosure. The imaging and depth sensors 870A and 870B may include the macropixels and saturation overflow prevention techniques included in this disclosure. Illumination modules 860A and 860B that emit light pulse may be co-located in or near imaging and depth sensors 870A and 870B in order to facilitate ToF functionality. Placing the imaging and depth sensors 870A and 870B near the pupil (or at least inline with a gaze of the pupil as the user gazes in a forward direction) may be advantageous so that any imaging or depth sensing done by the sensor is from the same/similar perspective as the user and thus any re-projection/display of the environment to the user will be from a more realistic perspective.

In implementations of the disclosure, the depth frames are used to map out the environment in the vicinity of the user, for example to prevent collisions or to calculate the position of superimposed synthetic objects. Although a VR headset is illustrated in FIG. 8, implementations of the disclosure may also be integrated into AR glasses and other applications.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "logic" (e.g. logic 320, 370, 420, and 470) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A depth and imaging macropixel comprising:
Single-Photon Avalanche Diode (SPAD) micropixels;
a depth memory array configured to store photon times-of-arrival histogram data;
an intensity memory array configured to store intensity data; and
timed memory selection logic configured to:
generate the photon times-of-arrival histogram data by incrementing memory locations in the depth memory array in response to avalanche events generated by the SPAD micropixels; and
increment the intensity memory array in response to the avalanche events in the depth and imaging macropixel.

2. The depth and imaging macropixel of claim 1, wherein the photon times-of-arrival histogram data stored in the depth memory array is processed to calculate a depth value, and wherein the intensity data stored in the intensity memory array provides intensity values having a higher spatial resolution than the depth image.

3. The depth and imaging macropixel of claim 1, wherein intensity memory locations of the intensity memory array correspond to a specific SPAD micropixel among the SPAD micropixels, and wherein the memory locations of the depth memory array are unassociated with specific SPAD micropixels.

4. The depth and imaging macropixel of claim 1, wherein the timed memory selection logic is configured to:
increment memory locations in the depth memory array in response to any of the SPAD micropixels generating the avalanche events; and
increment an intensity memory location of the intensity memory array in response to a specific SPAD micropixel generating an avalanche event.

5. The depth and imaging macropixel of claim 1, wherein the memory locations of the depth memory array correspond to histogram bins incremented by the timed memory selection logic based on times of the avalanche events.

6. The depth and imaging macropixel of claim 1, wherein, in response to a first avalanche event, the timed memory selection logic is configured to simultaneously: (1) increment a memory location in the depth memory array to increment a histogram bin regardless of which of the SPAD micropixels generated the first avalanche event; and (2) select a specific intensity memory location of the intensity memory array to increment based on which of the SPAD micropixels generated the first avalanche event, the specific intensity memory location that is selected having a 1:1 correspondence with a specific SPAD micropixel that generated the first avalanche event.

7. The depth and imaging macropixel of claim 1, wherein the SPAD micropixels are configured to generate the avalanche events in response to near-infrared light becoming incident on the SPAD micropixels.

8. The depth and imaging macropixel of claim 1, wherein the SPAD micropixels include a first SPAD micropixel, a second SPAD micropixel, a third SPAD micropixel, and a fourth SPAD micropixel, wherein the depth and imaging macropixel is arranged as a 2×2 depth and imaging macropixel.

9. The depth and imaging macropixel of claim 1, wherein the timed memory selection logic is configured to:

ignore a threshold number of initial avalanche events by refraining from incrementing the intensity memory array in response to the threshold number of the initial avalanche events; and increment the memory locations in the depth memory array to generate the photon times-of-arrival histogram data in response to the initial avalanche events.

10. The depth and imaging macropixel of claim 1, wherein the depth memory array and the intensity memory array are in a same physical memory array.

11. A method of generating a histogram, the method comprising:

emitting light pulses;

incrementing histogram bins in response to avalanche events from light becoming incident on a Single-Photon Avalanche Diode (SPAD); and ceasing the incrementing of the histogram bins in response to saturation of any of the histogram bins, the saturation occurring when a maximum bin value of any of the histogram bins is reached.

12. The method of claim 11, further comprising:

shutting down analog circuitry of histogram circuitry configured to generate the histogram.

\* \* \* \* \*